(No Model.) 2 Sheets—Sheet 1.
M. JEFFERSON, W. W. L. LISHMAN & J. CLAPHAM.
SHAFT BEARING.
No. 557,510. Patented Mar. 31, 1896.
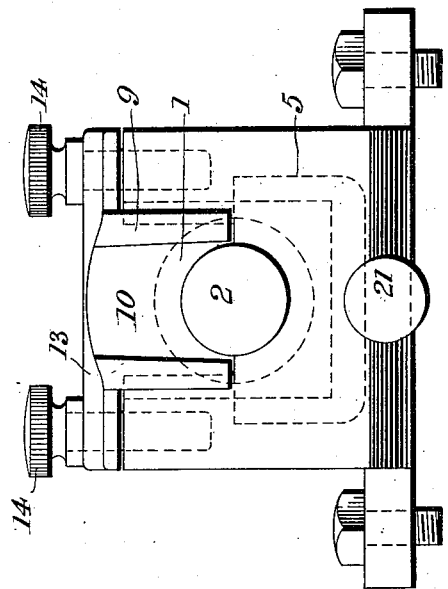
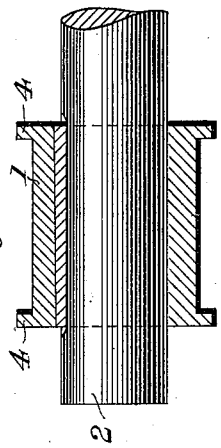
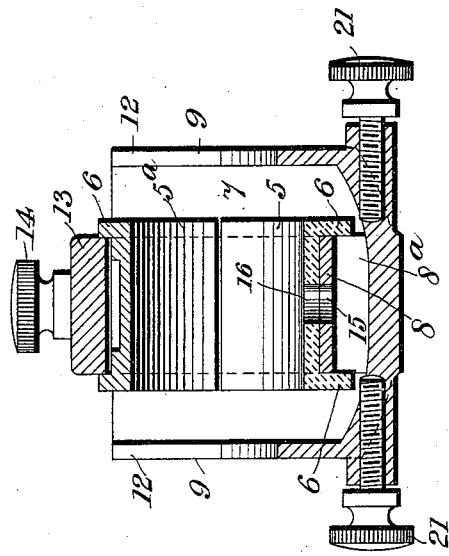
WITNESSES.
Holmes Clapham
Tom Longbottom
INVENTORS.
Mordecai Jefferson
Walter William L. Lishman
John Clapham (No Model.) 2 Sheets—Sheet 2.

M. JEFFERSON, W. W. L. LISHMAN & J. CLAPHAM.
SHAFT BEARING.

No. 557,510. Patented Mar. 31, 1896.

WITNESSES.
Holmes Clapham
Tom Longbottom

INVENTORS.
Walter William Lancaster Lishman
John Clapham
Mordecai Jefferson

UNITED STATES PATENT OFFICE.

MORDECAI JEFFERSON, OF BRADFORD, WALTER WILLIAM LANCASTER LISHMAN, OF CORNHOLME, AND JOHN CLAPHAM, OF BRADFORD, ENGLAND.

SHAFT-BEARING.

SPECIFICATION forming part of Letters Patent No. 557,510, dated March 31, 1896.

Application filed June 1, 1895. Serial No. 551,402. (No model.)

*To all whom it may concern:*

Be it known that we, MORDECAI JEFFERSON, residing at Bradford, in the county of York, WALTER WILLIAM LANCASTER LISHMAN, residing at Cornholme, in the county of Lancaster, and JOHN CLAPHAM, residing at Bradford, in the county of York, England, subjects of Her Majesty the Queen of Great Britain, have invented a certain new and useful Improvement in Shaft-Bearings, of which the following is a specification.

The object of this invention is to provide a means of lubricating the bearings of shafts whereby a sufficient supply of lubricant can be applied to the bearings to efficiently lubricate the latter for a considerable period and whereby all dripping and waste of the lubricant is obviated and the lubricant is protected from dust and dirt.

Figure 4:
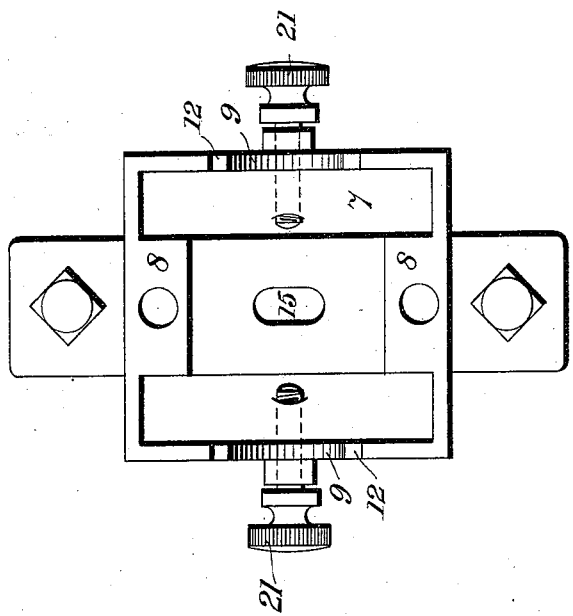
Figure 5:
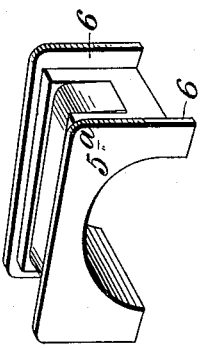
Figure 6:
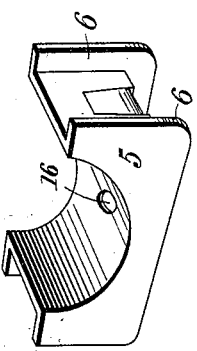

In the accompanying drawings, Figure 1 is an end elevation of one of our improved self-lubricating bearings for a shaft. Fig. 2 is a sectional side elevation of Fig. 1. Fig. 3 is a side elevation of part of a shaft with a boss or collar keyed thereon, shown in section. Fig. 4 is a plan view of Fig. 1, the caps and covers being removed. Figs. 5, 6, 7, and 8 are details drawn detached to clearly show their construction.

According to this invention a collar 1, Fig. 3, is fixed by nuts, keys, or otherwise onto the shaft 2. The collar 1 is at its ends flanged, as shown at 4, and is received and inclosed by the sleeve 5 $5^a$, Figs. 5 and 6, which latter is provided with flanges 6 6. The sleeve 5 $5^a$ is received in the reservoir or chamber 7, in which is cast the support or projecting part 8, having a passage $8^a$ in its base, and the flanges 6 6 of the sleeve 5 $5^a$ fit on each side of this support or projection 8, Fig. 2, and are thereby prevented from moving sidewise.

The chamber or reservoir 7 is cut away to within some distance of its bottom at 9 to allow the shaft 2 to be placed in position in the lower section of the sleeve 5 after the latter is placed in the chamber 7, whereupon the top section of the sleeve $5^a$ is placed over the collar 1 in the position shown in Fig. 2.

The chamber or reservoir 7 is filled with oil or lubricant up to the cut-away part 9, or the chamber may be filled partly with water and partly with lubricant, which will float on the surface of the water and lubricate the shaft or collar 1. When the pressure is applied to the top of the shaft, the bottom section 5 can be dispensed with.

Figure 7:
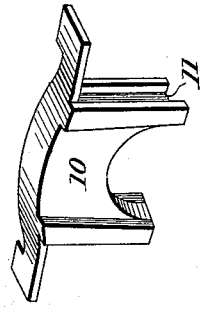
Figure 8:
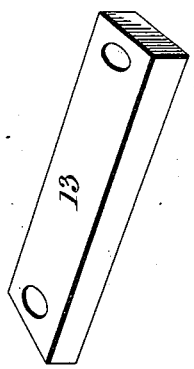

When the lubricant is placed in the chamber 7, the open portions 9 are closed by the side pieces or covers 10, Fig. 7, which are dropped down the cut-away portions, the said sides or covers being recessed at 11 for the edges 12 of the chamber or reservoir 7. The cap 13, Figs. 1, 2, and 8, is next fixed in position by the thumb-screws 14 to hold down the top section of the sleeve $5^a$. As the shaft revolves, the lubricant is drawn into the sleeve 5 $5^a$ and the bearing part or collar 1 is efficiently lubricated; but by reason of the collar 1 being employed the shaft proper is kept above the level of the lubricant, so that the latter does not overflow.

A passage or hole 15 is made in the support or projection 8 and a passage, hole or holes 16 in the lower section of the sleeve 5, so that the lubricant can readily find its way to the collar 1 by way of said holes and the passage $8^a$.

Screwed plugs 21 21 are provided at the bottom of the chamber or reservoir 7, so that the sediment, dirty water, or oil can be drawn off before replenishing the supply.

The boss or collar 1 may be made in halves or sections, locked, bolted, or screwed together, so that it can be placed in the required position on the shaft without the necessity of sliding it on from one or other end of such shaft.

What we claim is—

1. In combination, a shaft, a collar, secured thereon and provided with flanges, a sleeve made in sections and fitting between said flanges and itself provided with flanges, a support projecting between said flanges on the sleeve, the said support and sleeve being provided with passages for the lubricating material, an oil-chamber inclosing said support and sleeve, and a cap spanning the sides of said oil-chamber, and holding the upper section of the sleeve in place, substantially as described.

2. In combination, a shaft, a collar secured thereon and provided with flanges, a sleeve made in sections fitting between said flanges and itself provided with flanges, a support projecting between said flanges on the sleeve, the said support and sleeve being provided with passages for the lubricating material, an oil-chamber inclosing said support and sleeve, and a cap spanning the sides of said oil-chamber, and holding the upper section of the sleeve, and side pieces 10 sliding in bearings in the side of said chamber and closing the ends thereof above the shaft, substantially as described.

In testimony whereof we have hereunto set our hands in the presence of two subscribing witnesses.

MORDECAI JEFFERSON.
WALTER WILLIAM LANCASTER LISHMAN.
JOHN CLAPHAM.

Witnesses:
HOLMES CLAPHAM,
TOM LONGBOTTOM.